United States Patent [19]

Spencer

[11] 3,976,173

[45] Aug. 24, 1976

[54] TRANSMISSION DEVICES WITH NO-BACK BRAKES

[75] Inventor: Byron Arthur Thomas Spencer, Westwood, N.J.

[73] Assignee: Lucas Industries Limited, Birmingham, England

[22] Filed: Jan. 28, 1975

[21] Appl. No.: 544,786

[30] Foreign Application Priority Data
Feb. 13, 1974  United Kingdom................. 6519/74

[52] U.S. Cl................................. 192/8 R; 74/110; 74/764; 188/67; 188/82.3
[51] Int. Cl.².......................................... B60T 7/12
[58] Field of Search................. 192/8 R, 8 A, 8 C, 7

[56] References Cited
UNITED STATES PATENTS

| | | | |
|---|---|---|---|
| 2,458,441 | 1/1949 | Starkey............................... | 192/8 C |
| 2,710,085 | 6/1955 | Jungles................................... | 192/7 |
| 3,136,180 | 6/1964 | Sprague et al.................. | 192/8 C X |
| 3,576,240 | 4/1971 | Nicholson........................... | 192/8 R |
| 3,630,327 | 12/1971 | Nelson................................ | 192/8 R |

Primary Examiner—Benjamin W. Wyche

[57] ABSTRACT

A transmission device has input and output members interconnected by two transmission members. One of the transmission members has only Restricted movement in either direction, and relative movement between the transmission members is necessary for movement of the output member. A pair of brakes are operable by movement of said one transmission member to prevent movement of the other transmission member in respective opposite directions. The arrangement is such that operation of the brakes by one transmission member in response to movement of the input member does not prevent movement of the other transmission member, whereas operation of the brakes in response to movement of the output member arrests movements of the other transmission member.

12 Claims, 4 Drawing Figures

TRANSMISSION DEVICES WITH NO-BACK BRAKES

This invention relates to transmission devices which will not run back under the influence of an external load.

A transmission device according to the invention comprises a relatively fixed body, a movable input member, two transmission members movable by said input member, an output member responsive to movement of both of said transmission members, and a pair of brake arrangements operable by movement of one transmission member relative to said body to arrest movement of the other transmission member, one of said brake arrangements being operable by movement of said one transmission member in a first direction to prevent movement of said other transmission member in one direction, and the other of said brake arrangements being operable by movement of said one transmission member in a second direction to prevent movement of said other transmission member in a direction opposite to said one direction.

Embodiments of the invention will now be described by way of example and with reference to the accompanying drawings, in which.

Figure 1:
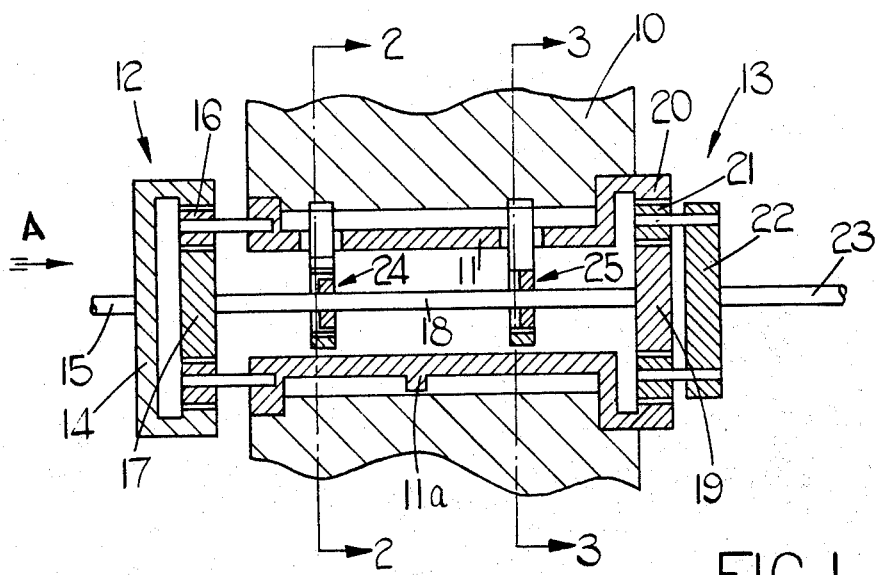
FIG. 1 is a diagrammatic longitudinal section through a first embodiment.
Figure 2:
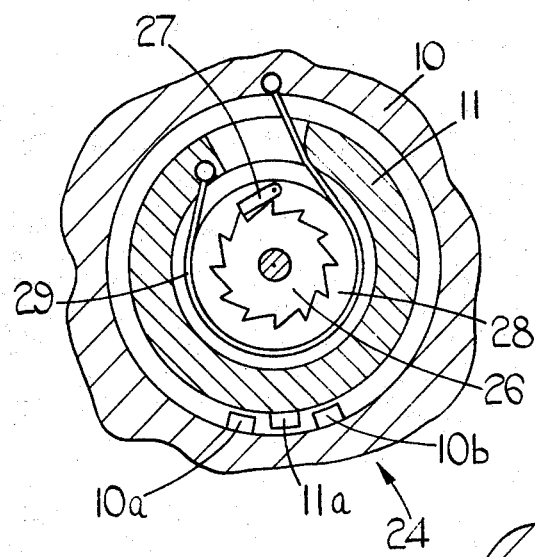
FIGS. 2 and 3 are sections, to a larger scale, on the corresponding lines in FIG. 1.
Figure 3:
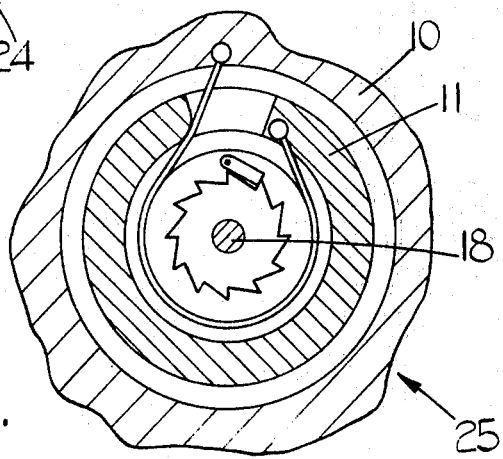

As shown in FIGS. 1, 2 and 3 a fixed body 10 supports a sleeve 11 which is rotatable in body 10. Sleeve 11 forms one transmission member between two epicyclic gear arrangements 12, 13.

Arrangement 12 has a ring gear 14 secured to an input shaft 15. Planet pinions 16 are engaged between ring gear 14 and a sun gear 17. Sun gear 17 is secured to a shaft 18 which forms a second transmission member between the gear arrangements 12, 13. The planet pinions 16 are carried by the sleeve 11.

Gear arrangement 13 has a sun gear 19 which is also secured to shaft 18. The end of sleeve 11 remote from gear arrangement 12 provides a ring gear 20 for arrangement 13. Planet pinions 21 are engaged between sun gear 19 and ring gear 20, and are carried by a plate 22 secured to an output shaft 23.

Two braking arrangements 24, 25, shown respectively in FIGS. 2 and 3, are mounted on shaft 18 and are operable to prevent rotation of the latter in respective opposite directions. Arrangement 24 has a ratchet 26 secured to shaft 18 and engageable by a pawl 27 on a wheel 28 rotatably mounted on shaft 18, so that clockwise rotation (as shown in FIG. 2) of ratchet 26 relative to wheel 28 is prevented. A brake band 29 extends through a gap in sleeve 11 and extends around wheel 28, the respective ends of band 29 being secured to body 10 and sleeve 11. A dog 11a on sleeve 11 is engageable with abutments 10a, 10b on body 10, to limit rotation of sleeve 11 in the event that either of the brake bands parts.

In use, therefore, clockwise rotation of sleeve 11 causes band 29 to arrest wheel 28, and thereby to prevent clockwise rotation of ratchet 26 and shaft 18. The same action also prevents further clockwise rotation of sleeve 11. Braking arrangement 25 acts in a similar manner, when sleeve 11 is urged anti-clockwise, to prevent anti-clockwise rotation of shaft 18 and also to prevent further anti-clockwise rotation of sleeve 11.

If input shaft 15 is driven clockwise, viewed on arrow A, sleeve 11 will be urged clockwise until stopped by brake band 29 of arrangement 24. Sun wheel 17 will be driven anti-clockwise and ratchet 26 will permit shaft 18 to rotate freely, even though wheel 28 is braked. Brake arrangement 25 is not applied. Anti-clockwise rotation of shaft 18 causes corresponding anti-clockwise rotation of output shaft 23, via sun wheel 22.

An anti-clockwise drive applied to input shaft 15 similarly causes output shaft 23 to be driven clockwise, brake arrangement 25 being applied and brake arrangement 24 being free.

If output shaft 23 is rotated clockwise under the influence of an external load, sleeve 11 is initially urged clockwise to apply brake arrangement 24. Sun wheel 19 and shaft 18 are also urged clockwise, but this rotation is prevented by ratchet 26 in arrangement 24. Reaction in gear arrangement 13 causes braking force to be increased with increasing external load. Anticlockwise rotation of shaft 23 under the influence of an external load is similarly prevented by brake arrangement 25.

Figure 4:
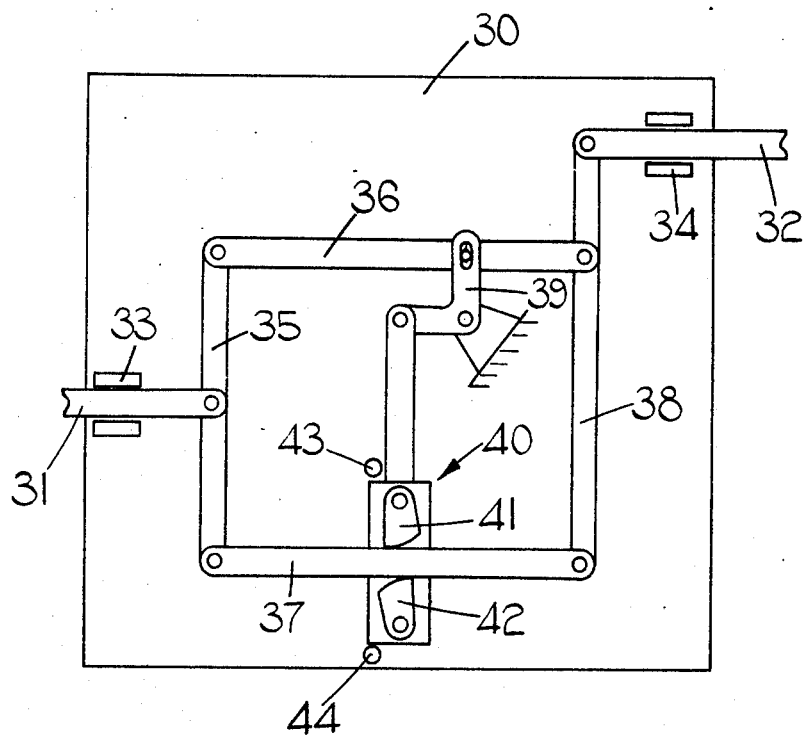
FIG. 4 shows, diagrammatically, an alternative embodiment.

The foregoing embodiment is a transmission device for rotary motion. The embodiment shown in FIG. 4 is an embodiment for transmitting linear motion.

A base plate 30 slidably supports input and output members 31, 32 slidable in respective guides 33, 34. Input member 31 is pivotally connected to the midpoint of a lever 35, to opposite ends of which are pin-jointed links 36, 37 which form first and second transmission members respectively. Links 36, 37 are in parallel spaced relationship and their ends, remote from lever 35, are pin-jointed to a further lever 38. Lever 38 extends beyond link 36 and is pivotally connected to output member 32.

A bell crank 39 is mounted on base plate 30 and has one end pinned to link 36. A brake arrangement 40 is slidably supported on base plate 30 and is movable by bell crank 39 in directions which are normal to the directions of movement of link 37. Brake arrangement 40 includes two brake elements 41, 42 which are engageable with link 37 as a result of movement of arrangement 40 in respective opposite directions. Elements 41 and 42 are mounted and formed so as to provide cam actions which respectively prevent movement of link 37 to the right and to the left, as seen in the drawing. Travel of brake arrangement 40 is limited by stops 43, 44.

In use movement of input member 31 to the right, initially urges both of links 36, 37 to the right, until link 36 is arrested by engagement of brake arrangement 40 with stop 43. Brake element 42 engages link 37 but can be moved to allow movement of link 37 to the right. Lever 35 pivots anti-clockwise and, via link 37 and lever 38, moves output member 32 to the left.

Movement of input member 31 to the left similarly causes output member 32 to be moved to the right, brake element 42 being moved clear of link 37 and brake element 41 moving to allow link 37 to move left.

Movement of output member 32 to the right, under the influence of an external load, causes initial movement of links 36, 37 to the right, applying brake element 42. Subsequent leftward movement of link 37 under the influence of this load is prevented by brake element 42, and the device becomes locked. Reaction on link 36 increases the braking action of element 42 as the external load increases.

Leftward movement of output member 32 by an external load is similarly prevented by brake element 41.

I claim:

1. A transmission device, comprising a relatively fixed body, a movable input member, two transmission members movable independently of each other by said input member, an output member responsive to movement of either of said transmission members, means for limiting movement, in either direction, of one of said transmission members relative to said body, and a pair of brake arrangements operable by movement of said one transmission member relative to said body to arrest movement of the other transmission member, one of said brake arrangements being operable by movement of said one transmission member in a first direction to prevent movement of said other transmission member in one direction, and the other of said brake arrangements being operable by movement of said one transmission member in a second direction to prevent movement of the other transmission member in a direction opposite to said one direction.

2. A device as claimed in claim 1 in which said input member, said output member and said transmission members are mounted for rotation with respect to said body.

3. A device as claimed in claim 2 which includes a first epicyclic gear arrangement interconnecting said input member and said transmission members, said first gear arrangement having a driving element coupled to said input member, a driven element coupled to one of said transmission members and a reaction element coupled to the other of said transmission members.

4. A device as claimed in claim 2 which includes a second epicyclic gear arrangement interconnecting said output member and said transmission members, said second gear arrangement having a driving element coupled to one of said transmission members, a driven element coupled to said output shaft and a reaction element coupled to the other of said transmission members.

5. A device as claimed in claim 2 in which said one transmission member comprises a sleeve, in which said second transmission member comprises a shaft passing coaxially through said sleeve, and in which said brake arrangement comprise two unidirectionally rotatable elements mounted on said second transmission member for rotation with respect thereto in respective opposite directions, and a first brake element operable by rotation of said sleeve in one direction to arrest movement of one of said unidirectionally rotatable elements, and a second brake element operable by rotation of said sleeve in the other direction to arrest movement of the other unidirectionally rotational element.

6. A device as claimed in claim 5 in which said brake elements comprise brake bands which are secured to said body and to said sleeve and which are respectively engageable with said unidirectionally rotatable elements.

7. A device as claimed in claim 1 in which said input member, said output member and said transmission members are mounted for linear movement relative to said body.

8. A device as claimed in claim 7 in which said transmission members comprise links mounted in spaced, substantially parallel relationship, one pair of adjacent ends of said links being pivotally connected to each other and to said input member by a first lever, and the other pair of adjacent ends of said links being pivotally connected to each other and to said output member by a second lever.

9. A device as claimed in claim 8 in which said input member is connected to said first lever intermediate the pivotal connections thereof with said links.

10. A device as claimed in claim 8 in which the pivotal connection of one of said links to said second lever is intermediate the pivotal connections of said second lever to said output member and the other of said links.

11. A device as claimed in claim 8 in which said brake arrangements comprise a pair of brake elements movable by one of said links in directions transverse to the directions of movement of the other of said links.

12. A device as claimed in claim 11 in which said brake elements are mounted for pivotal movement and have cam surfaces engageable with said other link to prevent movement thereof in respective opposite directions.

* * * * *